March 27, 1934.  P. ECKERT  1,952,241
EXTRUSION PRESS FOR MOLDING THERMOPLASTIC MATERIALS
Filed Oct. 2, 1930  4 Sheets-Sheet 1
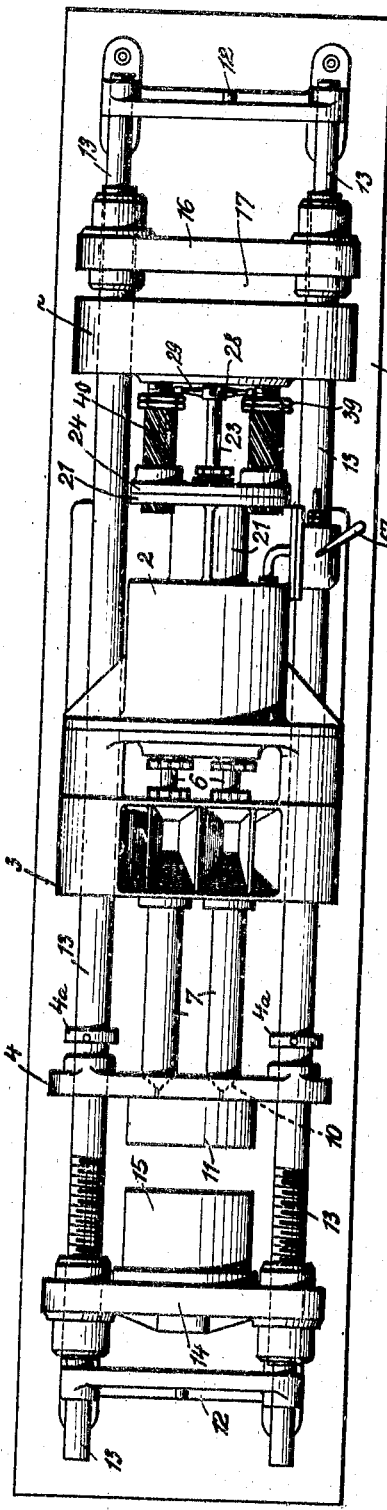
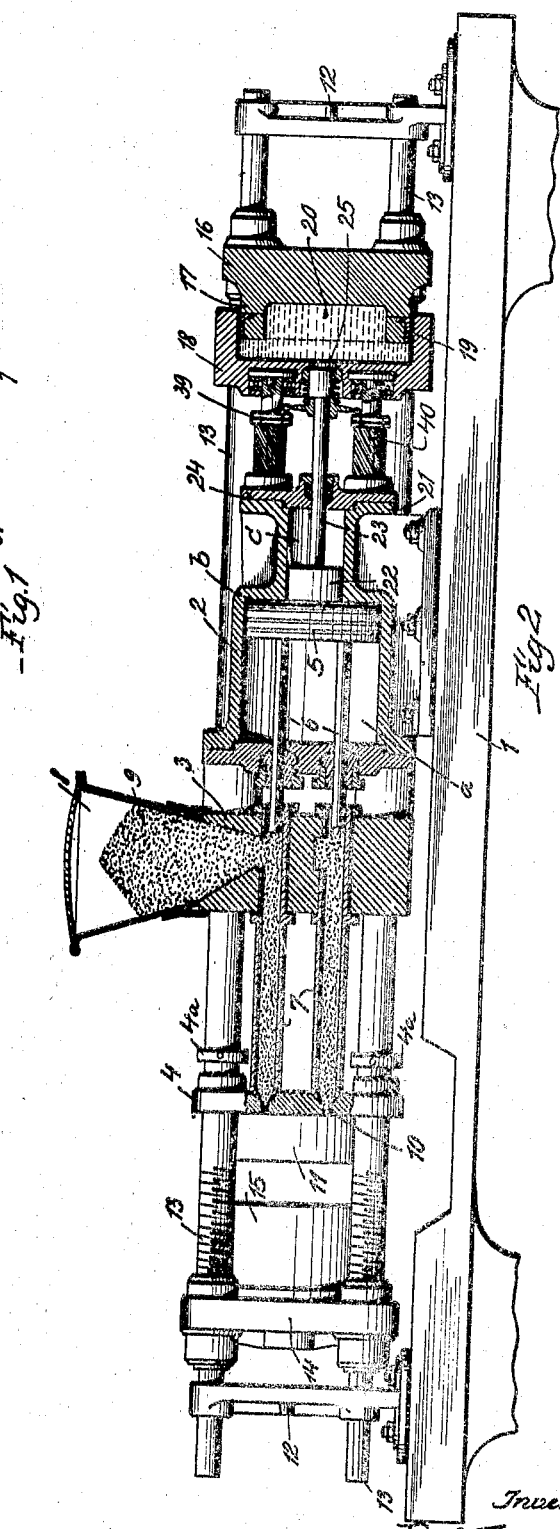
Inventor:
Paul Eckert
by
Attorneys.

March 27, 1934.  P. ECKERT  1,952,241
EXTRUSION PRESS FOR MOLDING THERMOPLASTIC MATERIALS
Filed Oct. 2, 1930  4 Sheets-Sheet 2
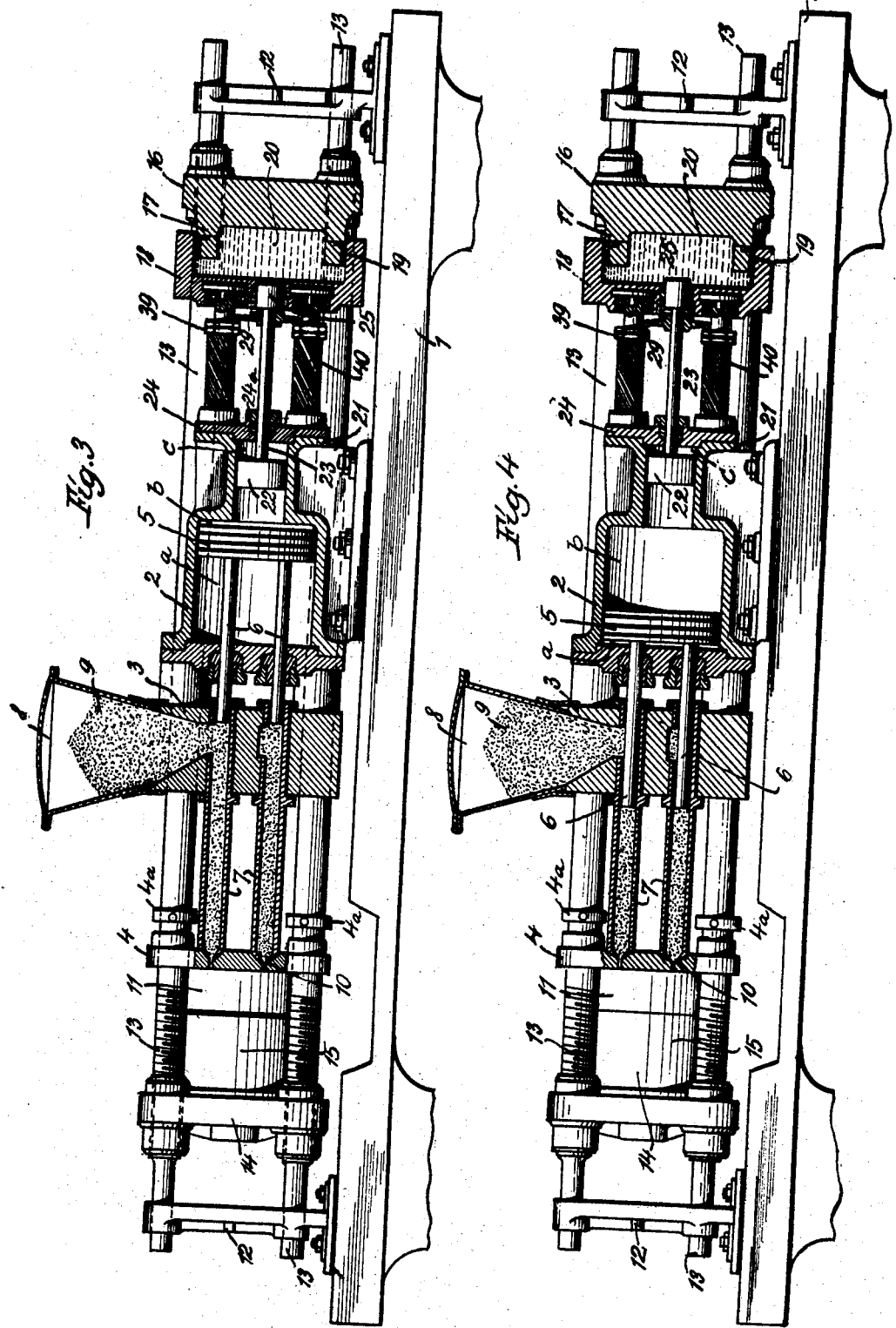
Inventor:
Paul Eckert
by
Attorneys.

March 27, 1934.  P. ECKERT  1,952,241
EXTRUSION PRESS FOR MOLDING THERMOPLASTIC MATERIALS
Filed Oct. 2, 1930   4 Sheets-Sheet 3
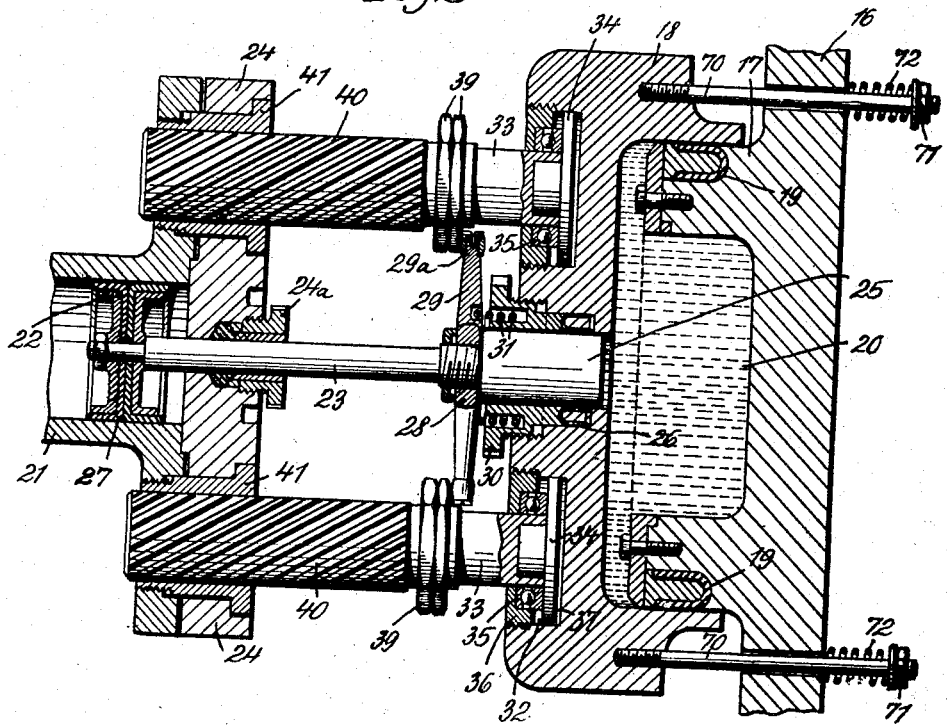
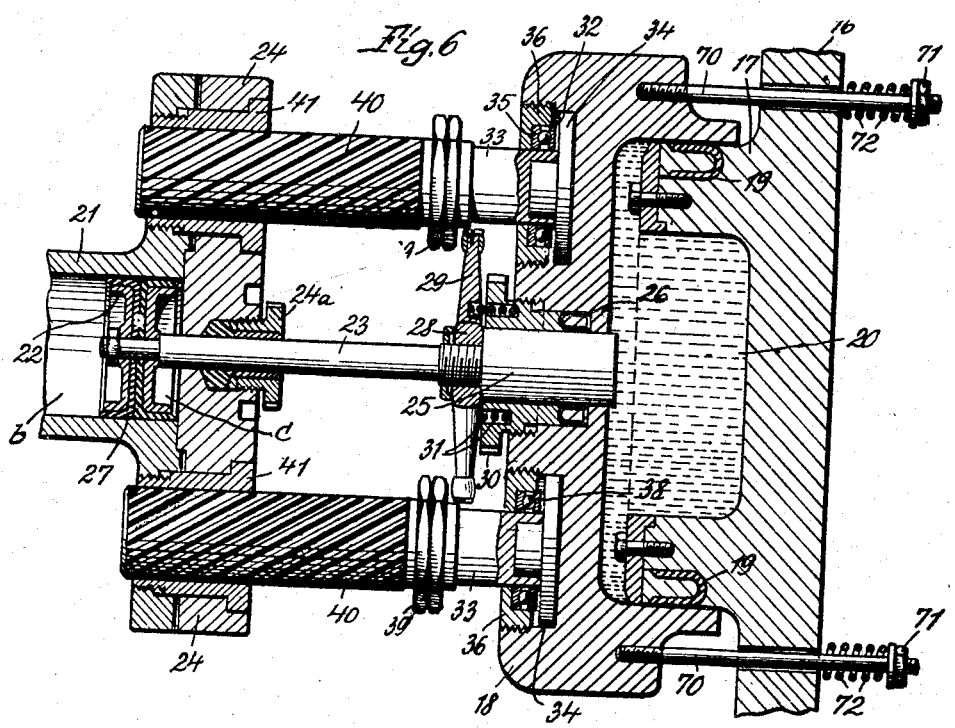
Inventor:
Paul Eckert
by Langner, Parry, Card & Langner
Attorneys.

March 27, 1934.    P. ECKERT    1,952,241
EXTRUSION PRESS FOR MOLDING THERMOPLASTIC MATERIALS
Filed Oct. 2, 1930    4 Sheets-Sheet 4
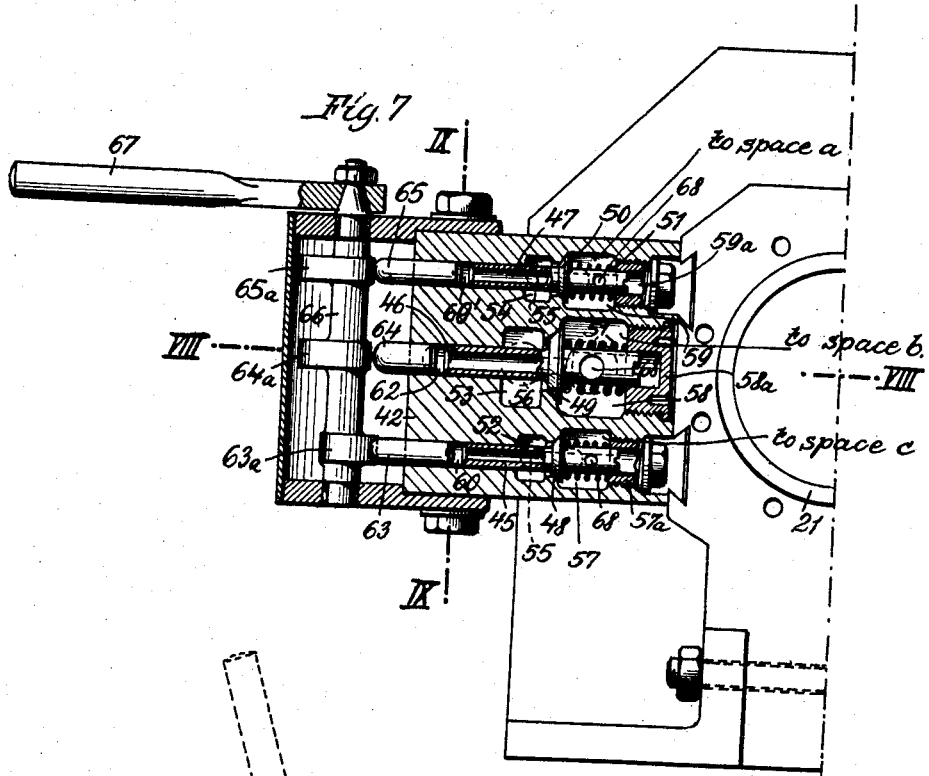
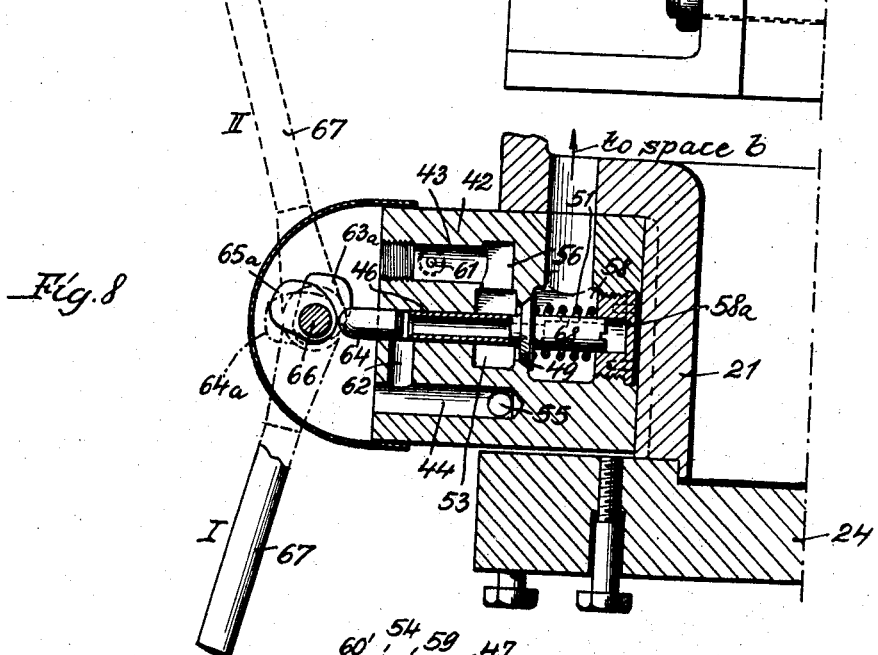
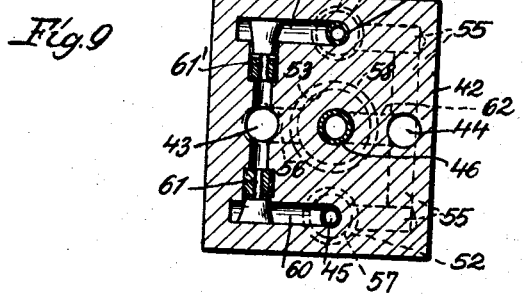
Inventor:
Paul Eckert
by: Langner, Parry,
Card + Langner
Attorneys.

Patented Mar. 27, 1934

1,952,241

UNITED STATES PATENT OFFICE 1,952,241

EXTRUSION PRESS FOR MOLDING THERMOPLASTIC MATERIALS

Paul Eckert, Cologne, Germany, assignor to Eckert & Ziegler G. m. b. H., Cologne-Braunsfeld, Germany, a corporation of Germany Application October 2, 1930, Serial No. 486,003
In Germany July 10, 1930

11 Claims. (Cl. 18—16)

My invention relates to extrusion presses for molding thermoplastic materials.

It is an object of my invention to design a press of this type for high-pressure operation.

To this end, I provide a divided mold and means controlled by pressure fluid, preferably the fluid by which the material is extruded, for moving into engagement the parts of the mold and for keeping them engaged during the molding operation.

My press may be used, for instance, for making castings of waste products in the manufacture of artificial silk.

In recent presses the operating fluid, generally compressed air, is under very high pressure, say 570 to 850 lbs. per squ. in. At such pressures the manually operated means as heretofore provided, such as toggle-lever mechanisms, are not able to keep the parts of the mold engaged during the molding operation.

The described operation, apart from keeping the mold parts engaged under all conditions, has the further advantage that the plunger, or plungers, in the extrusion cylinder, or cylinders, and the mold parts are controlled by a single mechanism. In this manner the same supply of pressure fluid, which will be referred to as "air" in the following specification, it being understood that any other fluid may be used instead; serves for performing the two operations at the same time.

It is desirable that the pressure exerted on the mold parts should be in excess of the pressure by which the material is extruded. This is accomplished by a suitable pressure multiplier, preferably of the hydraulic type, as it operates without shocks.

In the accompanying drawings, a press embodying my invention, a hydraulic multiplier, and a control, are illustraated by way of example.

In the drawings

Fig. 1 is a plan view of the press,

Figs. 2 to 4 are partly sectional elevations showing various positions of its parts, Figs. 5 and 6 are sections, drawn to a larger scale, showing the hydraulic multiplier in two positions, Fig. 7 is a sectional elevation of the control, and Figs. 8 and 9 are sections on the corresponding lines in Fig. 7.

Referring now to the drawings, and first to Figs. 1 to 4, 1 is the base plate of the machine on which are fixed a large power cylinder 2 and a block 3. 8 is a feed hopper on the block 3, 9 is the material to be extruded, and 7, 7 are two extrusion cylinders which are fixed in the block 3 at one end, and equipped with nozzles 10 at the other. 6 are the extrusion plungers in the cylinders 7, and 5 is a piston in the large cylinder 2 to which the plungers are secured. Means, not shown, such as resistance coils, gas burners or the like, are provided for heating the extrusion cylinders 7. 4 is a fixed cross head, 11 is one of the mold parts which is secured to the cross head and bored for the reception of the nozzles 10, 13 are a pair of parallel stays which extend along the press and are fitted to slide in two uprights at the ends of the base plate 1, 14 is a bracket which is adjustably mounted on the threaded rear ends of the stays, and 15 is the other or movable mold part which is fixed on the bracket 14. 16 is a hollow piston forming part of the hydraulic multiplier which is arranged at the front end of the press. The hollow piston 16 is made with a spigot 17 surrounding a cavity 20, and is secured on the stays 13. 18 is the cylinder of the multiplier which is fitted to slide on the stays 13, and 19 is a packing on the spigot 17 of piston 16.

The means for connecting the power cylinder 2 with the multiplier 16, 18 include a small cylinder 21 which is connected to the front end of the large cylinder 2, with a cover 24 and a stuffing box 24a at its front end, a piston rod 23 which is guided in the stuffing box, and pistons 22 and 25 at the rear and front ends, respectively, of the rod 23. The piston 22 is mounted to slide in the small power cylinder 21, and the piston 25 projects into the multiplier through a central bore in the cover of its cylinder 18.

It will appear from this description that while the large and small power cylinders 2 and 21, with the block 3, the extruston cylinders 7, the cross head 4 and the mold part 11, are permanently fixed, the bracket 14, with the mold part 15, and the hydraulic piston 16 are secured on the stays 13 and move with them, while the hydraulic cylinder 18 is free to slide on the stays.

Referring now to Figs. 5 and 6, 27 is a packing on the piston 22 which fits the cylinder 21, and 26 is a stuffing box through which the piston 25 is admitted into the hydraulic cylinder 18. 30 is the gland of the stuffing box 26, 31 is a spring in a recess of the gland, and 29 is a spider on the piston rod 23, with its boss 28 recessed for the reception of the rear end of spring 31. The spider has four arms, two of which appear in Figs. 5 and 6. 29 are antifriction rollers at the ends of the arms.

33 are four spindles, with flat threads 40 at their rear ends, which are mounted to turn in ball bearings 35 mounted in recesses 32 of the cover of the hydraulic cylinder 18. 34 are flanges at the ends of the spindles, and 36 are annular nuts at the open ends of the recesses 32 which hold the ball bearings 35 in position. The depth of the flanges 34 is less than the free space of the recesses so that the spindles are free to be displaced slightly in axial direction with respect to the hydraulic cylinder 18. 39 are adjustable dogs on the spindles 33 which are adapted to be engaged by the rollers 29a of the spider 29. The threads 40 of the spindles are supported in the nuts 47 which connect the cover 24 of the small power cylinder 21 with a flange at the front end of the cylinder. 70 are bolts in the cylinder 18 which project through bores in the piston 16, 71 are nuts at the free ends of the bolts, and 72 are springs inserted between the nuts and the piston 16.

Referring now to Figs. 7, 8, and 9, 42 is a casing for the control the position of which on the press is indicated in Fig. 1, 66 is a cam shaft in the casing, with three cams 63a, 64a, and 65a, and 67 is a handle on the cam shaft. 43, Fig. 8, is a passage connected with a supply of compressed air, not shown, and 44 is a passage which is open to the atmosphere. Intermediate these passages three control valves 48, 49, and 50 are arranged, with their hollow shafts 45, 46 and 47 in three bores of the casing 42. The outer ends of the hollow shafts are equipped with tapered seats which are adapted to be engaged by plugs 63, 64, 65 the outer ends of which project from the casing 42 and are adapted to be engaged by the cams on the shaft 66. Means, not shown, such as springs in the hollow shafts 45, 46, 47 are provided for holding the inner ends of the plugs away from the seats in the shafts, and in contact with the cams 63a, 64a, 65a.

The valves 48, 49, 50 are seated at the inner ends of cavities 52, 53, and 54 through which the shafts of the valves extend at some clearance. 57, 58, 59 are chambers at the opposite side of the valve seats in the recesses, each chamber being closed by a hollow plug 57a, 58a, 59a, respectively, in which the inner ends of the hollow valve shafts are guided, and 51 are springs inserted between the valves and their respective guiding plugs for seating the valves. The cavities 52 and 54 are connected with the open-air passage 44 by passages 55, 55', and the cavity 53 is connected with the supply passage 43 by a passage 56. The valve chambers are connected as follows: Chamber 57 to space c of cylinder 21, Fig. 3, chamber 58 to space b of cylinder 2, and chamber 59 to space a of cylinder 2, the several connections being not shown.

60 is a passage connecting the bore for the valve shaft 45 with the compressed-air passage 43, and 60' is a passage connecting the same with the bore for the valve shaft 47, 61 being perforated plugs in the passages for throttling the air, 68 are holes in the hollow valve shafts, and 62 is a passage connecting the bore for the valve shaft 46 to the open-air passage 44. The passages 60, 60', and 64 open into the respective bores in such positions that their ends are exposed by the plugs 63, 64, 65.

At the beginning of an operation the parts are in the positions shown in Fig. 2. The extrusion cylinders 7, 7 are charged with the material 9 from the hopper 8, and heated. The first step is to connect the two parts of the mold by bringing the stationary part 15 up to the fixed one, 11.

Handle 67 is moved from its normal position I, Fig. 8, into the position II. The cams on the shaft 66 are so designed as to operate the plugs 63, 64, and 65 in succession, beginning with the plug 63. This plug seats on the end of the hollow shaft 45 and interrupts the supply of compressed air from the passage 60. At the same time the valve 48 is pushed from its seat and the space c is connected with the atmosphere through chamber 57, recess 52, and passage 55. The compressed air from space c in cylinder 21 is permitted to escape while the space a is still under pressure as the valve 47 is still seated. The next valve to open is 49. Compressed air from 43, 56 and 53 is now admitted to the space b and the piston 22 is moved to the end of its stroke while the piston 5 in the large cylinder 2 remains in its position in which it is held by the air in the space a. The piston 25 at the front end of the rod 23 penetrates into the cylinder 18, compressing the spring 31 by the boss 28 of the spider 29, until the tension of the spring 31 overcomes the friction between the cylinder 18 and its piston 16. When the piston 22 moves further the cylinder 18, the piston 16, the stays 13, and the bracket 14 with the mold part 15, move in unison as the liquid in the cylinder 18 is practically incompressible. The mold is now closed, the movable part 15 engaging the fixed part 11, Fig. 3. Fig. 5 shows the position of the cylinder 18 and its piston 16 at the moment the mold closes. As soon as the cylinder 18 begins to move the flanges 34 at the ends of the spindles 33 engage the bearings 35, so that a clearance 37 is formed between the flanges and the end walls of their recesses 32. The spindles rotate while the cylinder 18 moves away from the cylinder cover 24 as their threads 40 are displaced in the nuts 41, and, due to the clearance at 37, their rotation is not interfered with by friction. Obviously the piston 16 can not move further after the mold has been closed but the piston 25 still penetrates into the cylinder 18. The consequence is that the cylinder 18 now moves toward the cylinder cover 24, and the ends of the recesses 32 engage the flanges 34 of the spindles 33. There is now a clearance 38, Fig. 6, at the side of the ball bearings and the flanges 34 are engaged under considerable friction so that further rotation of the spindles 33 is prevented. The cylinders 18 and 21 are now rigidly connected. The piston 25 still penetrates further and the pressure exerted by its small area is now multiplied at the rate of the area of the piston 25 and the much larger area of the piston 16 and the mold parts are held engaged at this very high pressure and will not come asunder during the molding operation. When the cylinder 18 moves toward the rear while the piston 16 is held stationary the springs 72 are compressed.

While this has occurred the shaft 66 has been rotated further and finaly the last cam 65a has closed the bore of the shaft 47 and opened the valve 47 so that the air from the space a at the rear of the large piston 2 is free to escape 59, 54, 55, and 43. The piston 2 now moves to the rear under the pressure in the space b, Fig. 4, and its plungers 6 extrude the material from the cylinders 7 into the mold. When the piston 2 is at the rear end of its stroke the molding operation is completed.

The handle 67 is now returned into the position I, Fig. 8. The plugs 65, 64, 62 are now released in succession by their respective cams, permitting the springs 51 to seat the valves 50, 49, 48. The rear ends of the hollow valve shafts 47, 46, 45 are laid open by the retracted plugs, compressed air from 43, 60 and 60' is admitted to the spaces $a$ and $c$, and the air from the space $b$ is discharged through the bore of the shaft 46, the passage 62, and the passage 44. The pistons 5 and 22 now return into the position Fig. 2, the plungers 6 are retracted, and fresh material from the hopper 8 is admitted to the extrusion cylinders 7. At the same time the piston 25 is retracted from the cylinder 18. As soon as it starts for its return stroke the arms of the spider 29 engage the dogs 39 on the spindles 33 and move the flanges 34 out of contact with the bottoms of their recesses 32. This breaks the rigid connection of the spindles 33 and the cylinder 18, and the spindles are free to rotate in their nuts 41, while the spider 29 entrains the cylinder 18 to the rear. The piston 16 of the cylinder 18 is entrained by the springs 72 on the bolts 70. The motion of the piston 16 is transmitted to the stays 13, and to the movable mold part 15, the mold is opened and the press is ready for the next operation.

The cross head 14 may be fitted so as to be displaced slightly, and checks 4a are arranged on the stays 13 for entraining it and for moving the cross head away from the ends of the extrusion cylinders 7.

Instead of a hydraulic multiplier 16, 18 as shown, I may provide any other suitable means, such as a gearing, or the like. Nor am I limited to the particular type of control shown in Figs. 7 to 9.

Obviously, I may provide a single extrusion cylinder with a single plunger 6, and instead of air or gas I may employ liquid as the pressure agent.

I claim:

1. An extrusion press comprising a movable and a fixed mold part, an extrusion cylinder, means for supplying thermoplastic material to said cylinder, a plunger for extruding material into the mold after its parts have become engaged, means for moving said movable part into engagement with said fixed part, a power cylinder, a piston in said power cylinder operatively connected to said plunger, another piston in said power cylinder operatively connected to said mold-part moving means, a pressure multiplier operatively connected to said last-named piston, and means for supplying pressure fluid to said pistons.

2. An extrusion press comprising a movable and a fixed mold part, an extrusion cylinder, means for supplying thermoplastic material to said cylinder, a plunger for extruding material into the mold after its parts have become engaged, means for moving said movable part into engagement with said fixed part, a power cylinder, a piston in said power cylinder operatively connected to said plunger, another piston in said power cylinder operatively connected to said mold-part moving means, a hydraulic cylinder, a plunger operatively connected to said last-named piston and adapted to enter said hydraulic cylinder, a piston in said hydraulic cylinder operatively connected to said movable mold part, and means for supplying pressure fluid to the pistons in said power cylinder.

3. An extrusion press for molding thermoplastic material comprising a divided mold, means for spraying material into said mold under high pressure, means for moving the parts of said mold into engagement and for keeping said parts engaged during the molding operation and a pressure multiplier combined with said last named means for keeping the parts of said mold engaged at a greater pressure than the pressure utilized for spraying the material into said mold.

4. An extrusion press for molding thermoplastic material comprising a divided mold, means for moving the parts of said mold into engagement, means for keeping said parts engaged during the molding operation and a pressure multiplier operatively connected to said last-named means so as to become active after said parts have moved into engagement for increasing the pressure at which said parts are engaged.

5. An extrusion press comprising a movable and a fixed mold part for supplying thermoplastice material in finely sub-divided condition to said mold parts under pressure, means for moving said movable part of said mold into engagement with said fixed part, and a hydraulic pressure multiplier operatively connected to said last-named means comprising a cylinder, means for fixing said cylinder with respect to said fixed mold part means, and a piston in said cylinder connected to said movable mold part.

6. An extrusion press for thermoplastic material comprising a movable and a fixed mold part, an extrusion cylinder, means for supplying thermoplastic material to said cylinder, a plunger for extruding said material into said mold after its parts have become engaged, means for moving said movable part of said mold into engagement with said fixed part, a power cylinder, a piston in said cylinder operatively connected to said plunger, another piston in said cylinder operatively connected to said means for moving said mold part, and means for supplying pressure fluid to both of said pistons.

7. An extrusion press for thermoplastic material comprising a movable and a fixed mold part, means for supplying thermoplastic material under pressure to said mold parts, means for moving said movable part of said mold into engagement with said fixed part, a hydraulic pressure multiplier for increasing the pressure of engagement between said mold parts comprising a cylinder, a spindle having a threaded portion rotatably mounted in said cylinder, a nut fixed with respect to said movable mold part in which said threaded portion is threaded whereby forward motion of said cylinder is substantially prevented, means controlled by the motion of said cylinder for holding said spindle against rotation, and a piston in said cylinder connected to said movable mold part whereby due to the prevention by said spindles of substantial forward motion of said cylinder the pressure engaging said mold parts in increased.

8. An extrusion press comprising a movable and a fixed mold part, means for supplying thermoplastic material to said mold parts under pressure, means for moving said movable part of said mold into engagement with said fixed part, and means for increasing the pressure between said movable part and said fixed part while in engagement comprising a cylinder, a threaded spindle rotatably mounted in said cylinder, a fixed nut in which said threaded spindle is carried, means controlled by the motion of said cylinder and including a friction clutch for holding said spindle against rotation, and a piston in said cylinder connected to said movable mold part.

9. An extrusion press for thermoplastic material comprising a movable and a fixed mold part, an extrusion cylinder, means for supplying thermoplastic material to said cylinder, a plunger for extruding said material under pressure into said mold after its parts have become engaged, means for moving said movable part of said mold into engagement with said fixed part, a power cylinder, a piston in said cylinder operatively connected to said plunger, another piston in said power cylinder operatively connected to said moving mold part means, a hydraulic cylinder, a plunger operatively connected to said last named piston and adapted to enter said hydraulic cylinder, a spindle having a threaded portion rotatably mounted in said hydraulic cylinder for locking said power cylinder relative to said hydraulic cylinder, a fixed nut carrying said threaded portion of said spindle, a friction clutch controlled by the motion of said hydraulic cylinder for holding said spindle against rotation, means connected to said plunger for disengaging said friction clutch, and means for supplying a pressure fluid to said pistons in said power cylinder.

10. An extrusion press comprising a divided mold having a movable and a fixed part, an extrusion cylinder, means for supplying thermoplastic material to said cylinder, a cylinder having a pair of communicating bores, a piston reciprocating in one of said bores, a plunger carried by said piston for forcing said material under pressure into said mold, a second piston reciprocating in said other bore of said cylinder, and means cooperating with said last named piston for moving said movable part of said mold into engagement with said fixed part.

11. An extrusion press comprising a divided mold having a movable and a fixed part, an extrusion cylinder, means for supplying thermoplastic material to said cylinder, a cylinder having a pair of communicating bores, a piston reciprocating in one of said bores, a plunger carried by said piston for forcing said material under pressure into said mold, a second piston reciprocating in said other bore of said cylinder, means cooperating with said last named piston for moving said movable part of said mold into engagement with said fixed part, and a pressure multiplier associated also with said last named piston for increasing the pressure of engagement between said movable part and said fixed part of said mold so that said pressure of engagement exceeds the pressure exerted by said plunger in forcing the material into said mold.

PAUL ECKERT.